Aug. 28, 1923.
H. E. STURCKE
1,465,955
APPARATUS FOR TREATING LIQUIDS
Filed July 29, 1919
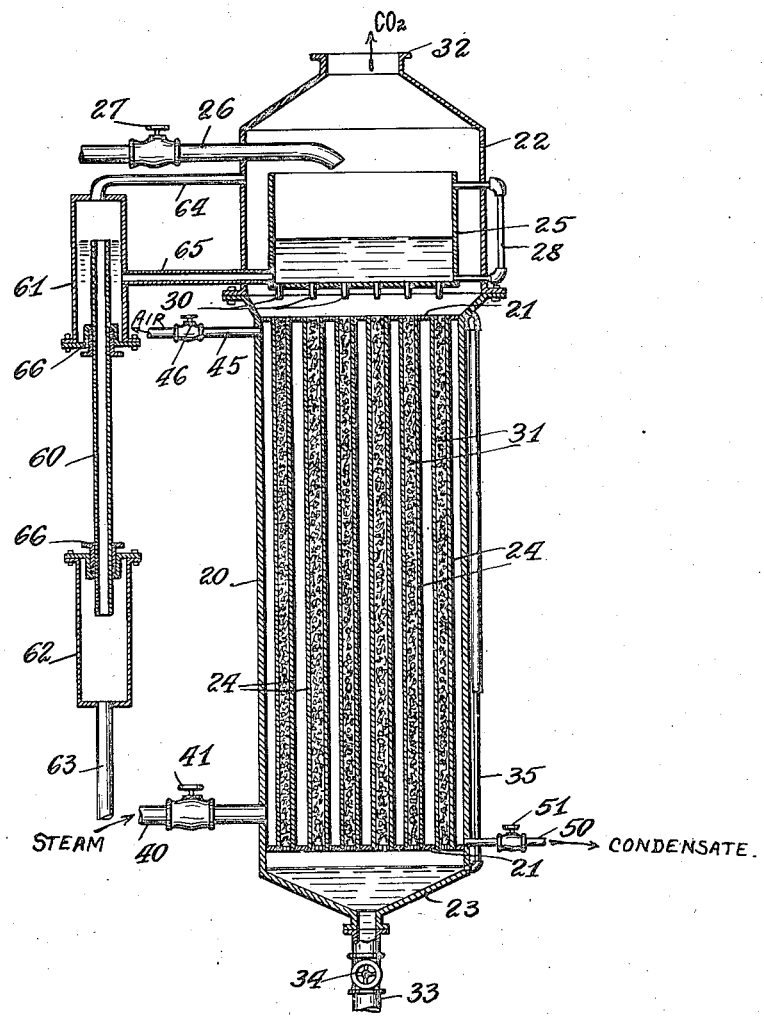
INVENTOR
Herman E. Sturcke
BY
his ATTORNEY Patented Aug. 28, 1923.

1,465,955

UNITED STATES PATENT OFFICE.

HERMAN E. STURCKE, OF BROOKLYN, NEW YORK, ASSIGNOR TO GENERAL CARBONIC COMPANY, OF NEW YORK, N. Y., A CORPORATION OF NEW YORK.

APPARATUS FOR TREATING LIQUIDS.

Application filed July 29, 1919. Serial No. 314,052.

*To all whom it may concern:*

Be it known that I, HERMAN E. STURCKE, a citizen of the United States, residing at Brooklyn, New York city, in the county of Kings and State of New York, have invented certain new and useful Improvements in Apparatus for Treating Liquids, fully described and represented in the following specification and the accompanying drawing, forming a part of the same.

The invention relates to an apparatus for evaporating liquids, heating solutions to drive off gases, and analogous uses. The invention is especially useful for separating gases from liquids in which the gases are contained, and particularly for separating a gas which is present in the form of a chemical combination with other elements in a solution. Still more particularly, the invention is especially adaptable to the separation of carbon dioxide in the form of gas from a "solution" or liquid in which the carbon dioxide is present in combination with an alkali, either sodium or potassium.

The invention will be here described in connection with the production of carbon dioxide, but it is to be understood that the apparatus is capable of other uses, and I do not limit my invention except as claimed hereinafter.

A solution containing carbon dioxide is obtained by treating mixed gases, including carbon dioxide, with a solution of an alkaline mono-carbonate, resulting in the conversion of a portion of the mono-carbonate by chemical reaction into an alkaline bi-carbonate. The amount of carbon dioxide which thus goes into combination is sometimes referred to as "semi-bound" gas since it is the amount of the carbon dioxide necessary to form the alkaline bi-carbonate in the solution in excess of the amount necessary to form the mono-carbonate of the original solution. A certain percentage of this semi-bound gas is removable by heating or "boiling" the solution.

Previous apparatus for boiling the solution have produced unsatisfactory results, mainly because of the fact that the solution gives up the carbon dioxide in percentages which decrease very rapidly during successive equal time periods. For instance, if a solution containing only bi-carbonate of potassium is heated, the percentages of semi-bound carbon dioxide that will be driven off in successive time units are as follows:—

45 % in the first time unit,
18 % in the second time unit,
11 % in the third time unit,
6½ % in the fourth time unit,
4½ % in the fifth time unit,
2 % in the sixth time unit,
1 % in the seventh time unit,
.7% in the eighth time unit,
.5% in the ninth time unit,
.4% in the tenth time unit, 89.6% in ten first time units.

Long continued boiling will drive out a little more carbon dioxide. However, the liberation of carbon dioxide becomes so slow that days of boiling does not liberate the last "semi-bound" gas, although in a few minutes the first 50% was liberated.

Previous apparatus have also been unsatisfactory for the further reason that if the solution is relatively weak in semi-bound carbon dioxide, the rate of separation of the acid is much slower. For example, if the solution contains only 55% of the alkali in the form of bi-carbonate with the remainder in the form of mono-carbonate, in three successive time units only 35½% of the carbon dioxide can be boiled out, whereas with the pure solution in the same period 74% of the carbon dioxide is liberated. In other words, with the 55% solution the amount liberated is less than ½ of the amount liberated under the same condition from the pure solution.

It follows from the foregoing that heretofore with an apparatus of given capacity if a quantity of fresh solution is introduced into the heating receptacle either an unreasonable amount of time will have to be devoted to driving out a large percentage of the gas, with the percentage rapidly diminishing during successive time units; or else to avoid time waste, the solution will have to be drawn from the apparatus while it still contains a considerable percentage of semi-bound gas. Various expedients have been tried to improve conditions, such as drawing off a part of the boiled solution after a relatively short time interval and replacing it with fresh solution; placing the solution in shallow pans, etc. These expedients fail to produce any very material increase in the percentage of gas extracted in reasonable time, for reasons deducible from the foregoing explanation, or understood by persons familiar with this art.

To avoid difficulties involved in the use of previous apparatus and to greatly increase the percentage of gas extracted from a solution of a given strength in a given time, my invention provides, described in general terms, an apparatus in which the solution is passed continuously through narrow, or finely divided, spaces and simultaneously heated. The carbon dioxide gas is taken off from the upper ends of these passages or spaces and the boiled solution is drawn off from the bottom. Preferably, the direction of movement of the solution is counter to the direction of movement of the heating medium, so that the greatest amount of heat is supplied to the parts of the columns or films of solution which are relatively weak in semi-bound gas, while the smaller amount of available heat is applied to the relatively strong solution. Desirably, also the small liquid passages are filled with suitable material for still further dividing or separating the liquid into thin films or narrow streams, so that it may be more effectively and quickly heated and the semi-bound acid more quickly driven out. Suitable material for this purpose is loosely arranged small plates, disks or turnings of steel or other material which retards the flow of the solution and separates it into fine films and is at the same time a good conductor of heat and not subject to chemical attack by the solution.

The accompanying drawing shows one exemplifying form of apparatus embodying my invention. It is to be understood that the apparatus may be embodied in other forms and may be varied within reasonable limits, within the principles of the invention as herein disclosed.

A steam cylinder 20 is provided with upper and lower heads 21. A dome 22 forms an upper continuation of the cylinder. At the bottom of the cylinder is located a sump 23 to receive boiled-out solution. The sump and the dome are connected by a plurality of solution tubes 24, suitably inserted in the headers. The dome contains a tank 25 for fresh solution which is introduced into it through a pipe 26, controlled by a valve 27, up to a level indicated by a gage 28. At the bottom, the solution tank is provided with a plurality of nozzles 30, each discharging into one of the tubes 24. The tubes are preferably filled with finely divided material, such as steel chips or shavings 31. At the top the dome has a connection 32 through which extracted carbon dioxide may pass to any suitable storing or compressing apparatus. The bottom sump 23 has a pipe 33 controlled by a valve 34 through which boiled-out solution may be drawn off. A gage 35 connected to the sump and to the lower part of the dome, respectively, indicates the level of liquid in the sump and tubes, if any liquid is retained therein. Steam is admitted to the cylinder through pipe 40 controlled by valve 41. A pipe 50 controlled by valve 51 provides for drawing off water of condensation. A pipe 45 connected to the upper end of the cylinder and controlled by valve 46 provides for discharging air from the cylinder whenever necessary.

One convenient arrangement for maintaining a proper level of solution in tank 25, and for adjusting this level, consists, as shown in the drawing, in an adjustable overflow pipe 60. The upper end of pipe 60 is contained in a larger pipe 61 and the lower end is contained in a large pipe 62, from the bottom of which a pipe 63 leads to the main solution container. The upper end of large pipe 61 is connected to dome 22 by a pipe 64, and an intermediate part of pipe 61 is connected to tank 25, near its bottom, by a pipe 65. The overflow pipe 60 has an adjustable and water-tight connection with large pipes 61 and 62 by means of suitable stuffing boxes 66. By moving pipe 60 up and down the level of solution in tank 25 will be maintained adjustably at the same level as the upper end of pipe 60. By maintaining the proper head of liquid in the tank, the rate of flow through nozzles 30 may be controlled in accordance with the nature of the solution, degree of heat, and other conditions, to give the proper heating effect in the time the solution requires to pass through the tubes.

The casing being properly filled with steam, fresh solution is introduced into tank 25 through pipe 26 up to the proper level, and then runs through nozzles 30 into heating tubes 24, in each of which the solution passes down through the finely divided heat conducting filling and is thoroughly exposed in finely divided condition to heat passing through the pipe walls. As the solution descends through the tubes, it becomes progressively hotter and gas is driven off most freely near the bottom of the tubes. This gas rises through the tubes and near the tops encounters the fresh solution coming from nozzles 30. The solution in tank 25 is pre-heated to a certain extent, but is relatively cooler than the hot gases in the tubes. The solution entering the tubes, therefore, takes up heat from the heated gas and at the same time cools the gases and prevents foaming over from the tubes into the dome. The result of the heat interchange described is a counter-current effect, inasmuch as the greatest amount of available heat is applied to the solution as it is nearest the bottoms of the tubes, where the solution is relatively weak in gas, so that all the remaining gas which can practically be extracted is driven off, while the relatively rich solution near the tops of the tubes receives a less degree of heat, but sufficient to drive off a considerable part of the gas in the upper portions of the tubes. The exposure of the solution in the tubes for a very few minutes suffices to drive off a very large percentage—all that can practically be extracted—of the semi-bound gas.

The gas extracted rises through the pipes and through the dome 22 and passes out through the connection 32. By a suitable regulation of the flow of the liquid, the sump 23 may be kept practically empty. The valves and the gage 35 provide for retaining a certain amount of boiled-out solution in the sump and lower ends of the pipes, to insure proper supply of solution to the intake of a pump (not shown) for conveying the solution back for reemployment in the first part of the process.

Evidently, in the use of this apparatus, practically only fresh solution is exposed to heat, or at any rate any given part of the solution is in contact with the heating medium for only a very few minutes. The most efficient extraction is thereby obtained in accordance with the principles previously detailed, and difficulties encountered when a certain amount of solution is boiled a long time or when fresh solution is mixed with partly boiled-out solution are avoided.

My apparatus is so efficient that heat may be supplied by exhaust steam from engines at a pressure of only from 3 to 5 pounds. The slight back pressure occasioned by this utilization of the exhaust does not detract to any noticeable extent from the efficiency of the engine. In old methods it was found necessary to use steam at a pressure of from 15 to 25 pounds, and frequently it was necessary to use live steam in connection with available exhaust steam to provide sufficient heat.

It will be evident from the previous explanation of the principles of the apparatus that they may be employed for boiling or evaporating other liquids or solutions, and I do not consider it necessary to explain in detail the adaptation of the apparatus in connection with such other liquids or solutions.

What is claimed is:

1. In a boiler for a solution containing a semi-bound gas, the combination of a steam cylinder having upper and lower headers, a plurality of tubes passing through the cylinder and connected to the headers, a dome at the top of the cylinder, a sump at the bottom of the cylinder, a solution tank in the dome having its bottom spaced from the upper ends of said tubes and provided with apertures to deliver solution into said tubes, a connection in the dome for discharge of liberated gas, and a drain pipe at the bottom of the sump.

2. In a liquid heater, the combination of a steam container, means for supplying steam thereto, a plurality of tubes passing through said container, a tank for liquid having its bottom spaced from the upper ends of said tubes, and means for passing liquid from the tank downwardly through said tubes while permitting gas evolved in the tubes to pass out the upper ends of the tubes below the bottom of the tank.

3. In a liquid heater, the combination of a steam cylinder, means for supplying steam thereto, a dome at the top of the cylinder, a plurality of small tubes passing through the cylinder, a receiving tank for liquid in said dome having its bottom spaced from the upper ends of said tubes, means for flowing liquid from the tank downwardly through the tubes while permitting gas or vapor evolved in the tubes to pass out the upper end of the tubes below the bottom of the tank, to collect in said dome, means for collecting liquid at the bottom of said tubes, and a discharge connection for the delivery of gas or vapor collected in the dome.

4. In a liquid heater, the combination of a plurality of vertically arranged narrow conduits, means for supplying heat to the exterior of the conduits, a tank for liquid arranged above the conduits having apertures through which the liquid flows into said conduits, means for supplying liquid to the tank, and means for maintaining the liquid in the tank at a predetermined level comprising a chamber connected to the tank by a passage below the liquid level and a passage above the liquid level, and an adjustable overflow outlet from said chamber.

In testimony whereof I have hereunto set my hand in the presence of two subscribing witnesses.

HERMAN E. STURCKE.

Witnesses:
ETHEL JOHNES,
D. M. SMITH.